US012769073B2

(12) United States Patent
Zhou et al.

(10) Patent No.: US 12,769,073 B2
(45) Date of Patent: Oct. 20, 2026

(54) ACTIVE OPTICAL CABLE

(71) Applicant: Accelink Technologies Co., Ltd., Wuhan (CN)

(72) Inventors: Yun Zhou, Wuhan (CN); Benqing Quan, Wuhan (CN); Yubang Sheng, Wuhan (CN); Hongjun Sun, Wuhan (CN)

(73) Assignee: Accelink Technologies Co., Ltd., Wuhan City (CN)

( * ) Notice: Subject to any disclaimer, the term of this patent is extended or adjusted under 35 U.S.C. 154(b) by 389 days.

(21) Appl. No.: 18/564,760

(22) PCT Filed: Jul. 23, 2021

(86) PCT No.: PCT/CN2021/108223
§ 371 (c)(1),
(2) Date: Nov. 28, 2023

(87) PCT Pub. No.: WO2022/217775
PCT Pub. Date: Oct. 20, 2022

(65) Prior Publication Data
US 2024/0302613 A1 Sep. 12, 2024

(30) Foreign Application Priority Data
Apr. 15, 2021 (CN) ......................... 202110407854.1

(51) Int. Cl.
*G02B 6/42* (2006.01)
*G02B 6/38* (2006.01)

(52) U.S. Cl.
CPC ......... *G02B 6/4292* (2013.01); *G02B 6/3874* (2013.01); *G02B 6/3893* (2013.01)

(58) Field of Classification Search
CPC .. G02B 6/3825; G02B 6/3874; G02B 6/4246; G02B 6/428; G02B 6/4281; G02B 6/4285; G02B 6/4292
See application file for complete search history.

(56) References Cited

U.S. PATENT DOCUMENTS 10,359,586 B2 7/2019 Teo et al.
2012/0163757 A1* 6/2012 Shigehara ............ G02B 6/4249 385/89

(Continued)

FOREIGN PATENT DOCUMENTS

CN 202421546 U 9/2012
CN 104823093 A 8/2015

(Continued)

OTHER PUBLICATIONS

International Search Report for PCT/CN2021/108223 dated Nov. 29, 2021.

(Continued)

*Primary Examiner* — Michael Stahl
(74) *Attorney, Agent, or Firm* — Lei Fang, Esq.; Smith Tempel Blaha LLC

(57) ABSTRACT

Disclosed is an active optical cable comprising an optical cable; optical modules, arranged at each of two ends of the optical cable and optically coupled with the optical cable, at least one of which is detachably connected with the optical cable; a first connecting terminal connected to one end of the optical cable and optically coupled with the optical cable; a second connecting terminal connected to the optical module and optically coupled with the optical module, the first connecting terminal and the second connecting terminal being optically coupled; and a connecting sleeve which is connected between the optical cable and the second connecting terminal and keeps the first connecting terminal and the second connecting terminal in an optical coupling state, (Continued)

wherein at least one of the optical cable and the second connecting terminal is detachably connected with the connecting sleeve.

8 Claims, 4 Drawing Sheets

(56) References Cited

U.S. PATENT DOCUMENTS

| | | | | |
|---|---|---|---|---|
| 2014/0185988 | A1 | 7/2014 | Qi et al. | |
| 2014/0348468 | A1 | 11/2014 | Lagziel et al. | |
| 2019/0187392 | A1 * | 6/2019 | Wang | G02B 6/422 |
| 2019/0197392 | A1 | 6/2019 | Leobandung | |

FOREIGN PATENT DOCUMENTS

| | | | |
|---|---|---|---|
| CN | 205608255 | U | 9/2016 |
| CN | 110673271 | A | 1/2020 |
| CN | 112055825 | A | 12/2020 |
| KR | 10-2017-0013685 | A * | 2/2017 |

OTHER PUBLICATIONS

International Written Opinion for PCT/CN2021/108223 dated Nov. 29, 2021.

* cited by examiner

ACTIVE OPTICAL CABLE

CROSS-REFERENCE

This application is a 371 U.S. National Phase of PCT International Application No. PCT/CN2021/108223 filed on Jul. 23, 2021, which claims a benefit of, and priority to Chinese patent application No. 202110407854.1 filed on Apr. 15, 2021, the disclosure of each of which is hereby expressly incorporated by reference herein in its entirety.

TECHNICAL FIELD OF THE DISCLOSURE

The disclosure relates to the field of optical communication technology, and specifically relates to an active optical cable.

BACKGROUND

With the rapid development of cloud computing, big data and other technologies, data center switching networks have evolved from the mainstream 10 G/40 G/100 G system to the 25 G/100 G/400 G system. In this way, the demand for high-speed optical modules, especially for 400 G optical modules will significantly increase.

Active Optical Cables (AOCs) encapsulate two or more optical modules with an optical cable, and the transmission medium therein is an optical cable. The optical module of an AOC has optical components inside, and the optical ports are not exposed, whereby having higher reliability. The working distance is generally within 100 meters, which means the transmission distance is longer than that of passive optical cables. Therefore, the AOC is also more suitable for high-speed optical modules, and the demand for AOC also increases with the increase of high-speed optical modules.

However, in existing technologies, once the AOC is locally damaged, the whole AOC will be scrapped, resulting in higher manufacturing and user usage costs SUMMARY In view of this, embodiments of the present disclosure aim to provide an active optical cable that can reduce manufacturing costs and user usage costs.

In order to achieve the above purpose, the technical solution of the present disclosure embodiment is achieved as follows.

The embodiment of the present disclosure provides an active optical cable, comprising:

- an optical cable;
- optical modules, which are provided on each of two ends of the optical cable, and are optically coupled with the optical cable, wherein at least one optical module is detachably connected to the optical cable;
- a first connecting terminal connected to one end of the optical cable and optically coupled to the optical cable, and a second connecting terminal connected to the optical module and optically coupled to the optical module, wherein the first connecting terminal and the second connecting terminal are optically coupled; and
- a connecting sleeve, which is connected between the optical cable and the second connecting terminal, and maintains the first connecting terminal and the second connecting terminal in an optically coupled state, wherein at least one of the optical cable and the second connecting terminals is detachably connected to the connecting sleeve.

In the above scheme, the connecting sleeve comprises a first accommodating space, and a first port and a second port which are respectively arranged at each of two ends of the first accommodating space, the optical cable entering the first accommodating space through the first port, the second connecting terminal entering the first accommodating space through the second port, and the first and second connecting terminals maintaining optical coupling within the first accommodating space; and

- the connecting sleeve further comprises at least one first positioning structure for positioning a position of the second connecting terminal, the first positioning structure positioning the second connecting terminal based on a width or thickness of the second connecting terminal.

In the above scheme, the first positioning structure comprises at least one first elastic mounting portion arranged at the second port, and the first elastic mounting portion comprises two opposite elastic plates, which clamp the second connecting terminal therebetween.

In the above scheme, the connecting sleeve further comprises at least one first positioning protrusion that prevents the second connecting terminal from retreating, the first positioning protrusion protruding from a side of the elastic plate facing the second connecting terminal, and the second connecting terminal has a contact surface that is away from the first connecting terminal, the first positioning protrusion abutting the contact surface.

In the above scheme, the connecting sleeve further comprises at least one second positioning structure for positioning the optical cable, and the optical cable comprises a third positioning structure that is matched with the second positioning structure, wherein the second positioning structure and the third positioning structure are positioned with each other through a concave-convex matching structure.

In the above scheme, the second positioning structure is at least one first positioning groove arranged on the inner wall of the first accommodating space, and the third positioning structure is a second positioning protrusion that is matched with the first positioning groove.

In the above scheme, the optical cable comprises an optical cable body and a first connecting terminal buckle sleeved on the optical cable body, and the first connecting terminal buckle comprises a second elastic mounting portion; the second elastic mounting portion comprises at least two elastic arms extending along an axial direction of the optical cable, and the two elastic arms are arranged opposite to each other; and one end of the elastic arm enters the first accommodating space through the first port, and a side of each of the elastic arms that is away from the other elastic arm is provided with a second positioning protrusion.

In the above scheme, the active optical cable further comprises a pre-compressed elastic component, which provides pre-pressure for the optical coupling between the first and second connecting terminals; the pre-compressed elastic component is located between the first connecting terminal buckle and the first connecting terminal, and the first connecting terminal buckle further comprises a second accommodating space for accommodating the pre-compressed elastic component, the second accommodating space being located between the two elastic arms.

In the above scheme, the first connecting terminal buckle further comprises a wedge-shaped surface, which is located on a side of each elastic arm away from the other elastic arm, and the wedge-shaped surface and the first port are in an interference fit.

In the above scheme, the active optical cable further comprises an optical module box base, and the optical module and the connecting sleeve are both installed on the optical module box base; the connecting sleeve further comprises a fixed flange configured to position a position of the connecting sleeve on the optical module box base.

According to an embodiment of the present disclosure, the detachable connection between the optical module and an active optical cable, and the reliable and stable transmission are achieved by providing an active optical cable with a first connecting terminal connected to one end of the optical cable and optically coupled to the optical cable, a second connecting terminal connected to the optical module and optically coupled to the optical module, and a connecting sleeve that maintains the optical coupling state of the first connecting terminal and the second connecting terminal. If the optical module at one end malfunctions, at least one of the optical cable and the second connecting terminal can be disconnected from the connecting sleeve, and the separation of the optical module from the optical cable can thus be achieved by only replacing the faulty optical module, thereby reducing manufacturing costs and user usage costs.

Other beneficial effects of the embodiments of this application will be further explained in conjunction with specific technical solutions in specific embodiments.

LIST OF REFERENCE SIGNS

Figure 1:
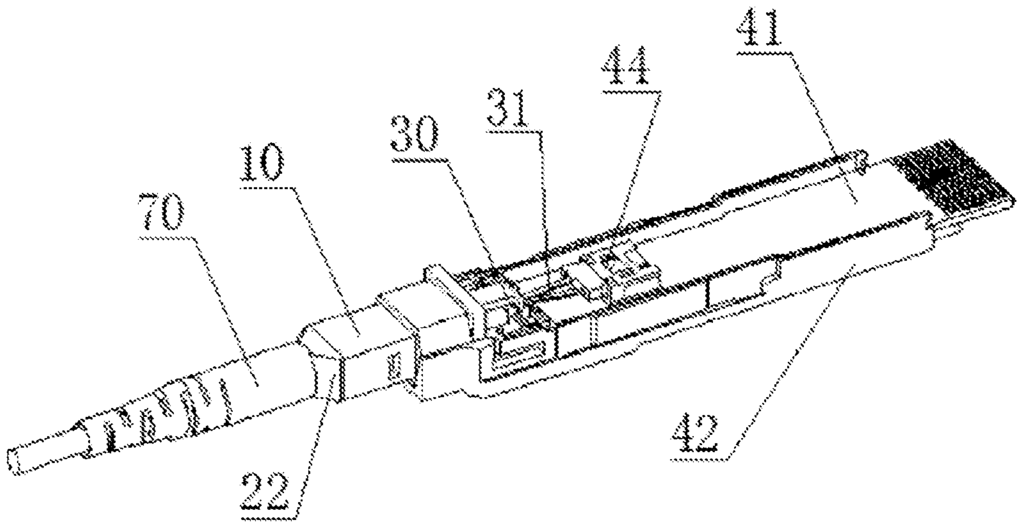
FIG. 1 is a schematic diagram of an active optical cable in an embodiment of the present disclosure.

10 connecting sleeve;
11 first accommodating space;
111 first positioning groove;
12 first port;
13 second port;
131 first positioning protrusion;
1311 first inclined plane;
132 elastic plate;
133 inserting limit plate;
140 fixed flange;
21 first connecting terminal;
22 first connecting terminal buckle;
221 elastic arms;
222 second positioning protrusion;
2221 second inclined plane;
2222 wedge-shaped surface;
223 second accommodating space;

224 knurled surface;
30 second connecting terminal;
31 connecting optical fiber;
41 PCB plate;
42 optical module box base;
43 optical module box upper cover;
44 optical components;
50 optical cable body;
60 pre-compressed elastic components;
70 fiber optic cable protection sleeve

DETAILED DESCRIPTION

In view of the problems in the prior art, the embodiments of the present disclosure provide an active optical cable, comprising:

an optical cable;

optical modules, which are provided on each of two ends of the optical cable, and are optically coupled with the optical cable, wherein at least one optical module is detachably connected to the optical cable;

a first connecting terminal connected to one end of the optical cable and optically coupled to the optical cable, and a second connecting terminal connected to the optical module and optically coupled to the optical module, wherein the first connecting terminal and the second connecting terminal are optically coupled;

a connecting sleeve, which is connected between the optical cable and the second connecting terminal, and maintains the first connecting terminal and the second connecting terminal in an optically coupled state, wherein at least one of the optical cable and the second connecting terminals is detachably connected to the connecting sleeve.

According to an embodiment of the present disclosure, an active optical cable is provided with a first connecting terminal connected to one end of the optical cable and optically coupled to the optical cable, a second connecting terminal connected to the optical module and optically coupled to the optical module, and a connecting sleeve that maintains the optical coupling state of the first connecting terminal and the second connecting terminal, thereby achieving the detachable connection with the optical module and achieving the reliable and stable transmission. If the optical module malfunctions at one end, at least one of the optical cable or the second connecting terminal can be disconnected from the connecting sleeve, therefore the separation of the optical module from the optical cable can be achieved by only replacing the faulty optical module, thereby reducing manufacturing costs and user usage costs.

That is, in the embodiment of this application, the active optical cable in the existing technology is improved as follows: separating the section of the optical cable closer to the optical module from the optical module, and adding a first connecting terminal and a second connecting terminal to achieve a detachable connection between the optical cable and the optical module.

The following will provide a further detailed explanation of the present disclosure in conjunction with the accompanying drawings and specific embodiments. It shall be appreciated that the specific embodiments described here are only used to explain this disclosure and are not intended to limit it in any manner. Moreover, the embodiments described below are only a portion of the embodiments of this disclosure, not all of them. All other embodiments which could be obtained by an ordinary skilled person in this field without creative labor based on these embodiments will fall within the scope of protection of this application.

Embodiment

Figure 2:
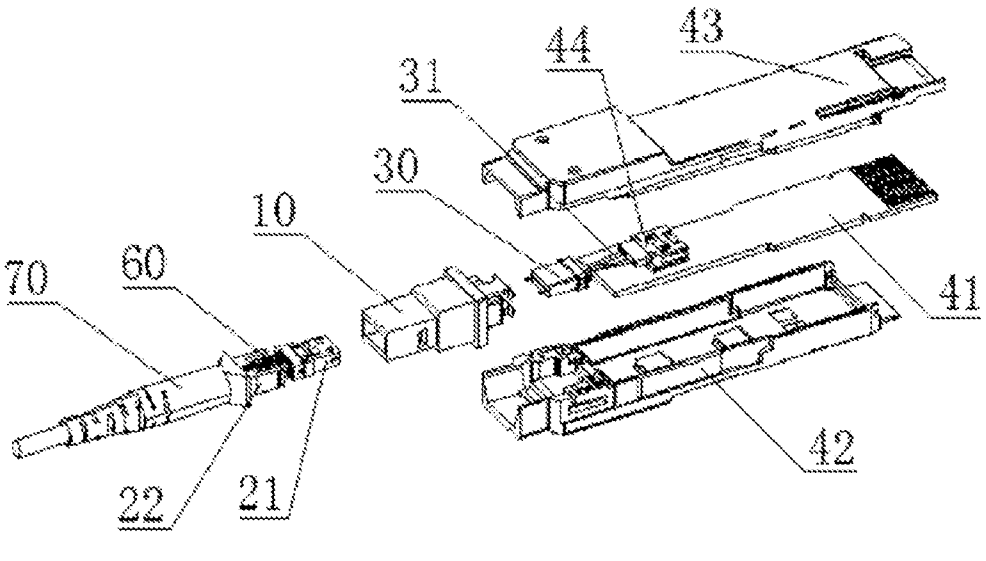
FIG. 2 is an exploded schematic diagram (explosion schematic diagram) of FIG. 1.

This embodiment provides an active optical cable. As shown in FIGS. 1 and 2, the active optical cable comprises:

an optical cable;

optical modules, which are provided on each of two ends of the optical cable, and are optically coupled with the optical cable, wherein at least one optical module is detachably connected to the optical cable;

a first connecting terminal 21 connected to one end of the optical cable and optically coupled to the optical cable, and a second connecting terminal 30 connected to the optical module and optically coupled to the optical module, wherein the first connecting terminal 21 and the second connecting terminal 30 are optically coupled;

a connecting sleeve 10, which is connected between the optical cable and the second connecting terminal 30, and maintains the first connecting terminal 21 and the second connecting terminal 30 in an optically coupled state, wherein at least one of the optical cable and the second connecting terminal 30 is detachably connected to the connecting sleeve.

Here, by way of example, the first connecting terminal 21 and the second connecting terminal 30 may be connected by plugging, i.e. achieving optical coupling.

The first connecting terminal 21 may be a female terminal, and the second connecting terminal 30 may be a male terminal. It can also be understood that the structures of two types of terminals are interchangeable.

The first connecting terminal 21 and the second connecting terminal 30 may both be multi ferrule (MT) connector terminals, that is, the first connecting terminal 21 may be a female terminal of the MT connector, and the second connecting terminal 30 may be a male terminal of the MT connector.

Here, the first connecting terminal 21 and the second connecting terminal 30 are kept in an optically coupled state through the connecting sleeve 10, in order to ensure a more stable and reliable optical coupling state therebetween.

Here, for the sake of simplicity and clarity of the accompanying drawings, FIGS. 1 and 2 only show an optical module and a section of the optical cable at one end of the active optical cable, and the optical module does not show all the components thereof.

Figure 3:
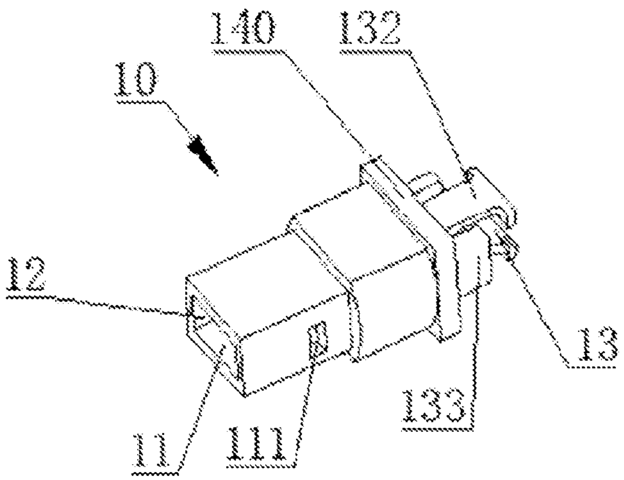
FIG. 3 is a three-dimensional schematic diagram I of a connecting sleeve in an active optical cable of an embodiment of the present disclosure.
Figure 4:
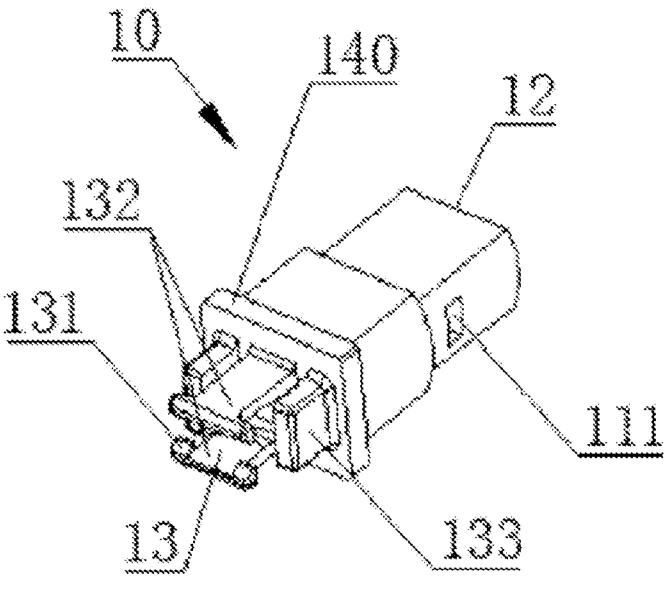
FIG. 4 is a three-dimensional schematic diagram II of a connecting sleeve in an active optical cable of an embodiment of the present disclosure.
Figure 5:
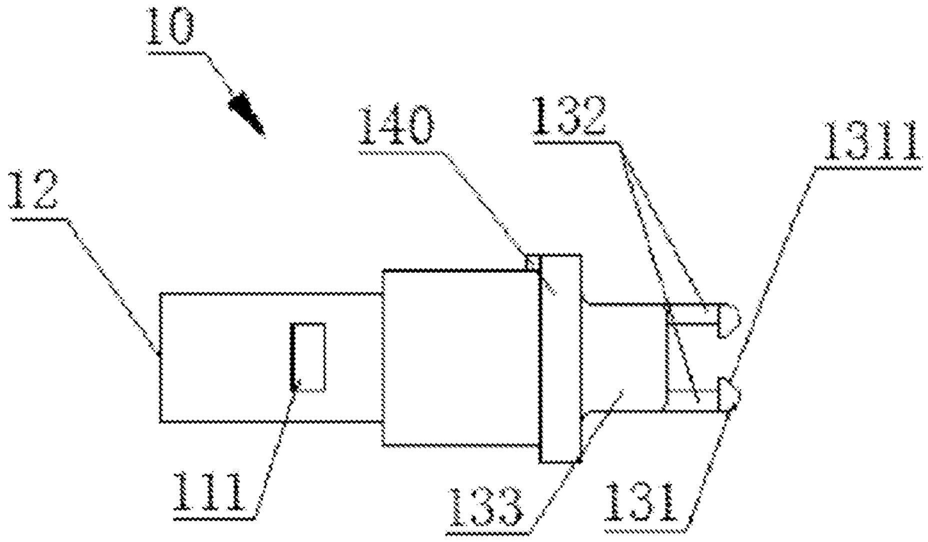
FIG. 5 is a projection schematic diagram of a connecting sleeve in an active optical cable of an embodiment of the present disclosure.

According to an optional implementation of the present disclosure, as shown in FIGS. 3 to 5, the connecting sleeve 10 comprises a first accommodating space 11 and a first port 12 and a second port 13 arranged at two ends of the first accommodating space 11. The optical cable enters the first accommodating space 11 through the first port 12, and the second connecting terminal 30 enters the first accommodating space 11 through the second port 13. The first connecting terminal 21 and the second connecting terminal 30 maintain an optical coupling state within the first accommodating space 11.

Here, by way of example, setting the first accommodating space 11 is more convenient for setting the corresponding structure to limit the position of the first connecting terminal 21 or the second connecting terminal 30. For example, based on the first accommodating space 11, the first or second positioning structure described below is arranged.

The first accommodating space 11 is a rectangular through groove with a cross-sectional shape of a rectangle, which is a spatial shape that is more suitable for the shape of the first connecting terminal 21 and the second connecting terminal 30.

The connecting sleeve 10 further comprises at least one first positioning structure for positioning the second connecting terminal 30, wherein the first positioning structure positions the second connecting terminal 30 based on the width or thickness of the second connecting terminal 30.

Here, by way of example, the first positioning structure positions the second connecting terminal 30 based on the width or thickness of the second connecting terminal 30, which not only enables positioning but also facilitates the entry or exit of the second connecting terminal 30. That is, the outer side of the second connecting terminal 30 is not provided with a special positioning structure, such as a protrusion or groove, thereby not hindering the entry or exit of the second connecting terminal 30.

According to an optional embodiment of the present disclosure, the first positioning structure comprises at least one first elastic mounting portion arranged at the second port 13, and the first elastic mounting portion comprises two opposing elastic plates 132, which clamp the second connecting terminal 30 therebetween. By clamping the second connecting terminal 30 through the elastic plate 132, the position of the second connecting terminal 30 can be restricted, and it is more convenient to lift the restriction, for example, as long as the operator pulls the elastic plate 132.

Due to the fact that the pulling of the elastic plate 132 does not require to use professional tools, it is also easier to repair and has good maintainability in use.

The elastic plate 132 is made of a material with high elastic modulus and is designed to have a smaller thickness and cantilever structure, thereby having greater elasticity and generating greater elastic clamping force.

The connecting sleeve 10 may be made of highly elastic plastic as a whole.

According to an optional embodiment of the present disclosure, the connecting sleeve 10 further comprises at least one first positioning protrusion 131 that prevents the second connecting terminal 30 from retreating, and the second connecting terminal 30 has a contact surface on one side away from the first connecting terminal 21, wherein the first positioning protrusion 131 abuts the contact surface. By limiting the retreating of the second connecting terminal 30, the connection between the second connecting terminal 30 and the first connecting terminal 21 can be made tighter, resulting in more reliable optical coupling.

The first positioning protrusion 131 protrudes from the side of the elastic plate 132 towards the second connecting terminal 30. Since the first positioning protrusion 131 is located on the elastic plate 132, the restriction on the second connecting terminal 30 to move back can be solved by simply pulling the elastic plate 132, without any influence on disassembly.

The first positioning protrusion 131 is provided with a first inclined plane 1311 guiding the second connecting terminal 30 to insert into the first accommodating space 11; that is, the first positioning protrusion 131 is similar to a hook, which does not hinder the insertion of the second connecting terminal 30, but can prevent the exit of the second connecting terminal 30. In this way, the insertion of the second connecting terminal 30 is easier.

The connecting sleeve 10 may further comprise two insertion limit plates 133, which are located at the second port 13 and perpendicular to the elastic plate 132 respectively. The insertion limit plate 133 and the elastic plate 132 form a quadrilateral channel for inserting the second connecting terminal 30 into the first accommodating space 11. In this way, the position limitation for the second connecting terminal 30 is more comprehensive.

According to an optional embodiment of the present disclosure, the connecting sleeve 10 further comprises at least one second positioning structure for positioning the optical cable, and the optical cable comprises a third positioning structure that is in coordination with the second positioning structure, wherein the second positioning structure and the third positioning structure are positioned with each other through a concave-convex matching structure. By achieving positioning through the mutual coordination of concave-convex matching structures, the structures could be simple and processing cost could be lowered down.

According to an optional embodiment of the present disclosure, the second positioning structure is at least one first positioning groove 111 positioned on an inner wall of the first accommodating space 11, and the third positioning structure is a second positioning protrusion 222 that is matched with the first positioning groove 111. Grooves and protrusions are a more easily implemented mode in concave-convex matching structures.

The first positioning groove 111 may be a rectangular groove, and the second positioning protrusion 222 may be a rectangular protrusion.

The second positioning protrusion 222 is provided with a second inclined plane 2221 that is easier to fit into the first positioning groove 111, thereby making it easier to install.

Figure 6:
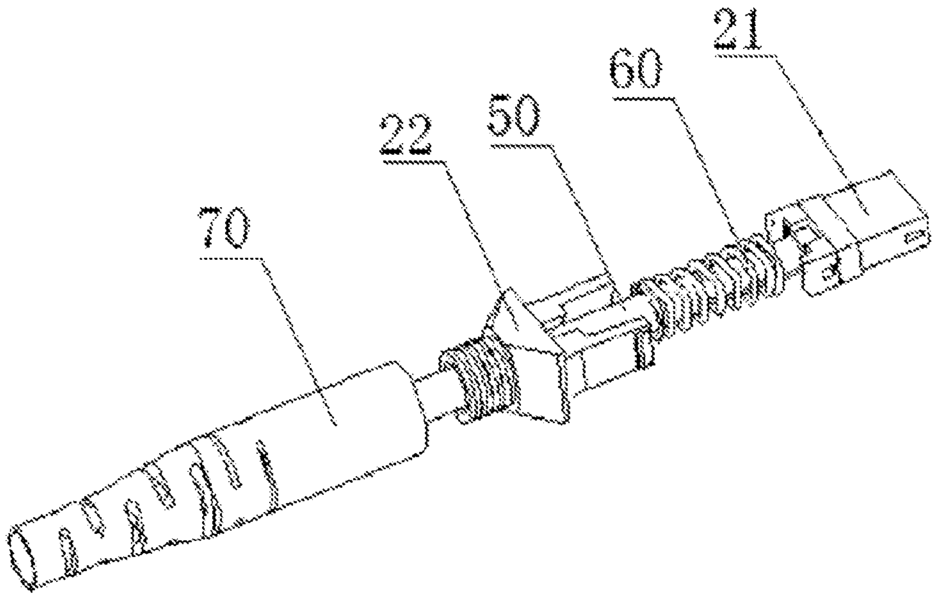
FIG. 6 is a schematic diagram of the assembly of an optical cable and a first connecting terminal in an active optical cable of an embodiment of the present disclosure.
Figure 7:
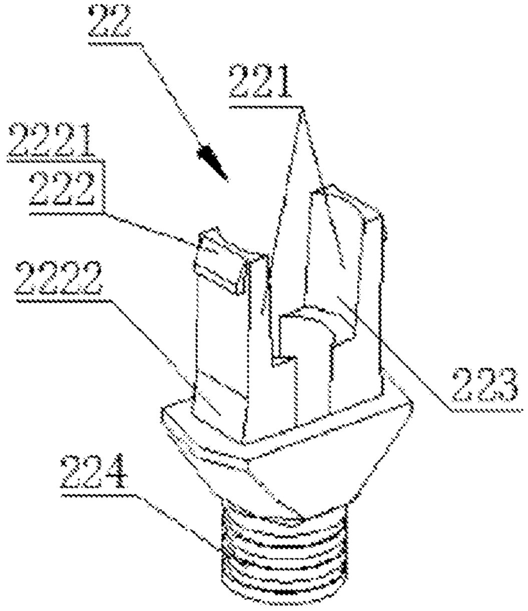
FIG. 7 is a three-dimensional schematic diagram I of a first connecting terminal buckle in an active optical cable of an embodiment of the present disclosure.
Figure 8:
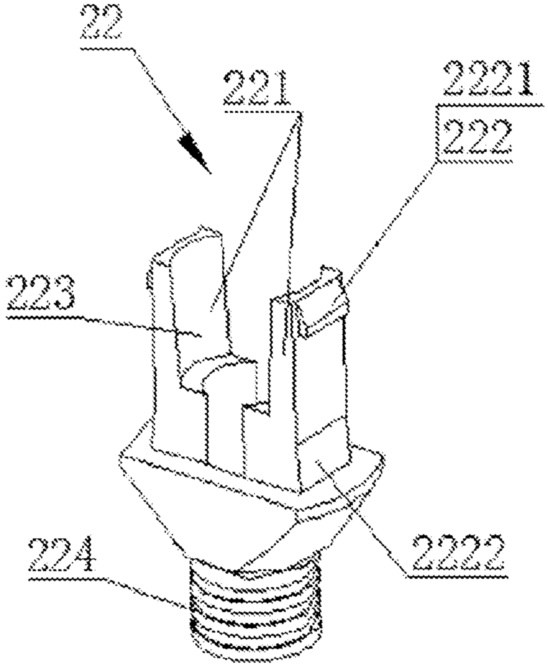
FIG. 8 is a three-dimensional schematic diagram II of a first connecting terminal buckle in an active optical cable of an embodiment of the present disclosure.

According to an optional embodiment of the present disclosure, as shown in FIGS. 6 to 8, the optical cable comprises an optical cable body 50 and a first connecting terminal buckle 22 sleeved on the optical cable body 50. The optical cable body 50 is a component for transmitting optical signals between two optical modules, and the first connecting terminal buckle 22 is configured to be connected to the connecting sleeve, which facilitates the convenient and stable connection of the optical cable body 50 to the connecting sleeve.

The first connecting terminal buckle 22 comprises a second elastic mounting portion; the second elastic mounting portion comprises at least two elastic arms 221 extending along an axial direction of the optical cable, and the two elastic arms 221 are arranged opposite to each other; and one end of the elastic arm 221 enters the first accommodating space 11 through the first port 12.

The side of each elastic arm 221 that is away from the other elastic arm 221 is provided with a second positioning protrusion 222. The arrangement of the elastic arm 221 enables the second positioning protrusion 222 to enter the first positioning groove 111 more smoothly, but the exit thereof will be limited, making the positioning more reliable.

The elastic arm 221 is also made of a material with high elastic modulus and is designed to have a certain length and be a cantilever structure, thereby allowing for greater elasticity.

The first connecting terminal buckle 22 may be made of highly elastic plastic as a whole.

The optical cable further comprises an optical cable protection sleeve 70 sleeved outside the optical cable body 50. The optical cable protection sleeve 70 is configured to protect the optical cable body 50, preventing from the damage to the optical cable body 50 but resulting in the decrease in optical transmission efficiency.

According to an optional embodiment of the present disclosure, the active optical cable further comprises a pre-compressed elastic component 60, which provides pre-pressure for the optical coupling of the first connecting terminal 21 and the second connecting terminal 30. In the case where the second connecting terminal 30 is limited in retraction, the pre-compressed elastic component 60 can make the optical coupling between the first connecting terminal 21 and the second connecting terminal 30 more stable, and even under external influences such as vibration, the connection therebetween is not easily be loosened.

The pre-compressed elastic component 60 can be a compression spring. The magnitude of the spring force of the compression springs can accurately control through a wire diameter, a pitch, and other parameters.

The pre-compressed elastic component 60 is located between the first connecting terminal buckle 22 and the first connecting terminal 21, and the first connecting terminal buckle 22 further comprises a second accommodating space 223 for accommodating the pre-compressed elastic component 60, and the second accommodating space 223 is located between two elastic arms 221. In this way, the space between the elastic arms of the first connecting terminal buckle 22 can be fully utilized, and the radial position of the pre-compressed elastic component 60 can also be limited, making the direction of the elastic force more stable.

According to an optional embodiment of the present disclosure, the first connecting terminal buckle 22 further comprises a wedge-shaped surface 2222, which is located on a side of each elastic arm 221 away from the other elastic arm 221, and the wedge-shaped surface 2222 is in an interference fit with the first port 12. The interference fit can further stabilize the connection between the first connecting terminal buckle 22 and the connecting sleeve 10. And due to its wedge-shaped shape, during installation, the interference amount increases from small to large, which allows for a large amount of interference without making installation difficult. However, during disassembly, the interference amount decreases from large to small, making it easier.

The first connecting terminal buckle 22 further comprises an axial through hole (not shown in the figure), which is used for threading the optical cable body 50. That is, the optical cable body 50 passes through the through hole from one end of the first connecting terminal buckle 22 to the other end, including passing through the second accommodating space 223, and connects with the first connecting terminal 21 to establish optical coupling between the optical cable and the first connecting terminal 21. In this way, the first connecting terminal buckle 22 can be stably sleeved on the optical cable body 50, and the optical cable body 50 can be connected to the first connecting terminal 21 through the first connecting terminal buckle 22.

One end of the optical cable protection sleeve 70 is fixed to the first connecting terminal buckle 22, and the end of the first connecting terminal buckle 22 far from the optical module is provided with a knurled surface 224 for fixing the optical cable protection sleeve 70. In this way, the connection between the optical cable protection sleeve 70 and the first connecting terminal buckle 22 is more secure, and the position of the optical cable body 50 is more stable.

According to an optional embodiment of the present disclosure, the active optical cable further comprises an optical module box base 42, wherein the optical module and the connecting sleeve 10 are both installed on the optical module box base 42; the connecting sleeve 10 further comprises a fixed flange 140, which is configured to locate the position of the connecting sleeve 10 on the optical module box base 42, and the optical module box base 42 is provided with a second positioning groove (not shown in the figure) that matches the fixed flange 140. In this way, the positions of the connecting sleeve 10 and the optical module can be relatively fixed, making the optical coupling between the optical cable and the optical module more stable.

Here, the fixed flange 140 is a rectangular convex ring surrounding the connecting sleeve 10 and configured for positioning, and it is different from the flange in general mechanical connections.

The active optical cable further comprises an optical module box upper cover 43, which is matched with the optical module box base 42 and configured to protect the optical module.

The optical module comprises a printed circuit plate (PCB) and a connecting fiber 31. The PCB 41 comprises an optical component 44, and both ends of the connecting fiber 31 are optically coupled to the optical component 44 and the second connecting terminal 30, respectively. The second connecting terminal 30 establishes optical coupling with the optical component 44 through the connecting fiber 31; that is, the second connecting terminal 30 establishes optical coupling with the optical module through the connecting fiber 31. In this way, the second connecting terminal 30 and the optical component 44 are flexibly connected, without hindering the insertion-connection operation between the second connecting terminal 30 and the connecting sleeve.

In order to ensure reliable connection, the connection between the connecting optical fiber 31 and the second connecting terminal 30, and the connection between the connecting optical fiber 31 and the optical component 44, are non detachable; for example, they can be further fixed by glue after installation, making it impossible to disassemble and the connection more stable.

It should be noted that the terms "comprising", "including", or any other variation thereof are intended to cover a non exclusive inclusion, such that a process, a method, an article, or a device that comprises a series of elements not only comprises those elements, but also other elements that are not explicitly listed, or also comprise elements inherent in such a process, a method, an article, or a device. Without further limitations, the element limited by the statement 'comprising a . . . ' does not exclude the existence of another identical element in the process, method, item, or device that comprises that element. The term 'connection', unless otherwise specified, comprises both direct and indirect connections.

It should be noted that in the embodiments of this application, unless otherwise specified and limited, the term "connection" should be understood broadly. For example, it can be an electrical connection or an internal connection between two components, either directly connected or indirectly connected through an intermediate medium. For ordinary technical personnel in this field, the specific meanings of the above terms can be understood based on specific circumstances.

If the terms "first/second/third" are used in the embodiments of this application, it only distinguishes similar objects and does not represent specific sorting for the objects. It can be understood that 'first, second, and third' can be interchanged in specific order or sequencer if allowed.

The various specific technical features described in the specific embodiments can be combined in any suitable way without contradiction, such as forming different embodiments and technical solutions through the combination of different specific technical features. In order to avoid unnecessary repetition, the various possible combinations of specific technical features in this application will not be explained separately.

The above is only a preferred embodiment of the present invention and is not intended to limit the scope of protection of the present invention. Any modifications, equivalent substitutions, and improvements made within the spirit and principles of the present invention should be comprised in the scope of protection of the present invention.

INDUSTRIAL PRACTICALITY

The present embodiments of the application achieve a detachable connection between the optical cable and the optical module and reliable and stable transmission by setting a first connecting terminal connected to one end of the optical cable and optically coupled to the optical cable, a second connecting terminal connected to the optical module and optically coupled to the optical module, and a connecting sleeve that maintains an optical coupling state of the first connecting terminal and the second connecting terminal. If the optical module at one end malfunctions, at least one of the optical cable and the second connecting terminal can be disconnected from the connecting sleeve to achieve the separation of the optical module from the optical cable by only replacing the faulty optical module, reducing manufacturing costs and usage costs.

What is claimed is:

1. An active optical cable, comprising:

an optical cable;

optical modules, which are provided at each of two ends of the optical cable, and optically coupled with the optical cable, wherein at least one optical module is detachably connected to the optical cable;

a first connecting terminal connected to one end of the optical cable and optically coupled to the optical cable, and a second connecting terminal connected to a first optical module of said optical modules and optically coupled to the first optical module, wherein the first connecting terminal and the second connecting terminal are optically coupled with each other;

a connecting sleeve which is connected between the optical cable and the second connecting terminal, and maintains the first connecting terminal and the second connecting terminal in an optically coupled state, wherein at least one of the optical cable and the second connecting terminal is detachably connected to the connecting sleeve, wherein the connecting sleeve comprises a first accommodating space, and a first port and a second port arranged at both ends of the first accommodating space, wherein the optical cable enters the first accommodating space through the first port, and the second connecting terminal enters the first accommodating space through the second port, and wherein the first connecting terminal and the second connecting terminal maintain an optical coupling state within the first accommodating space; and the connecting sleeve further comprises at least one first positioning structure for positioning the position of the second connecting terminal, and the first positioning structure positions the second connecting terminal based on a width or a thickness of the second connecting terminal;

wherein the first positioning structure comprises at least one first elastic mounting portion arranged at the second port, and the first elastic mounting portion comprises two opposing elastic plates, which clamp the second connecting terminal therebetween.

2. The active optical cable of claim 1, wherein the connecting sleeve further comprises at least one first positioning protrusion that prevents the second connecting terminal from retreating and that protrudes from a side of the elastic plate facing the second connecting terminal, and the second connecting terminal has a contact surface that is away from a side of the first connecting terminal, the first positioning protrusion abutting the contact surface.

3. The active optical cable of claim 1, wherein the connecting sleeve further comprises at least one second positioning structure for positioning the optical cable, and the optical cable comprises a third positioning structure that is matched with the second positioning structure, the second positioning structure and the third positioning structure being positioned with each other through a concave-convex matching structure.

4. The active optical cable of claim 3, wherein the second positioning structure is at least one first positioning groove arranged on an inner wall of the first accommodating space, and the third positioning structure is a second positioning protrusion that is matched with the first positioning groove.

5. The active optical cable of claim 4, wherein the optical cable comprises an optical cable body and a first connecting terminal buckle sleeved on the optical cable body, and the first connecting terminal buckle comprises a second elastic mounting portion; the second elastic mounting portion comprises at least two elastic arms extending along an axial direction of the optical cable, and the two elastic arms are arranged opposite to each other; and one end of the elastic arm enters the first accommodating space through the first port, and a side of each of the elastic arms that is away from the other elastic arm is provided with a second positioning protrusion.

6. The active optical cable of claim 5, wherein the active optical cable further comprises a pre-compressed elastic component, which provides pre-pressure for the optical coupling of the first connecting terminal and the second connecting terminal; the pre-compressed elastic component is located between the first connecting terminal buckle and the first connecting terminal, and the first connecting terminal buckle further comprises a second accommodating space for accommodating the pre-compressed elastic component, wherein the second accommodating space is located between two elastic arms.

7. The active optical cable of claim 6, wherein the first connecting terminal buckle further comprises a wedge-shaped surface located on the side of each elastic arm away from the other elastic arm; and the wedge-shaped surface and the first port are in an interference fit.

8. The active optical cable of claim 3, wherein the active optical cable further comprises an optical module box base, and one of said optical modules and the connecting sleeve both are installed on the optical module box base; and the connecting sleeve further comprises a fixed flange configured to position the position of the connecting sleeve on the base of the optical module box.

* * * * *